Figure 1A:
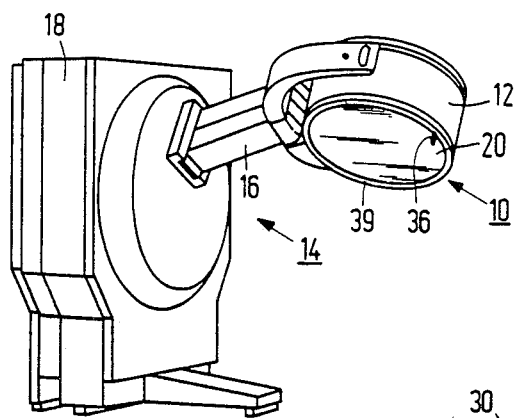

United States Patent [19]

Douma et al.

[11] Patent Number: 4,758,726
[45] Date of Patent: Jul. 19, 1988

[54] COLLIMATOR EXCHANGING SYSTEM

[75] Inventors: Foppe Douma; Hendrik J. Meulenbrugge, both of Eindhoven, Netherlands

[73] Assignee: U.S. Philips Corporation, New York, N.Y.

[21] Appl. No.: 839,000

[22] Filed: Mar. 12, 1986

[30] Foreign Application Priority Data

Mar. 15, 1985 [NL] Netherlands .......................... 8500748

[51] Int. Cl.⁴ ........................ G21K 1/02; G01T 1/164
[52] U.S. Cl. ............................. 250/363 R; 250/505.1; 378/148
[58] Field of Search ...................... 250/363 SH, 505.1; 378/148

[56] References Cited

U.S. PATENT DOCUMENTS

| | | | |
|---|---|---|---|
| 3,982,133 | 9/1976 | Jupa et al. | 378/148 |
| 4,109,155 | 8/1978 | Tschunt et al. | 378/148 |
| 4,620,105 | 10/1986 | Gosis et al. | 250/505.1 |
| 4,663,531 | 5/1987 | Ruike | 250/505.1 |

FOREIGN PATENT DOCUMENTS 90073  5/1984  Japan ................................. 378/148

Primary Examiner—Carolyn E. Fields
Attorney, Agent, or Firm—Paul R. Miller

[57] ABSTRACT

A collimator exchanging system for exchanging collimators between an active holding device (14) and a storage device (8) includes a cart (5) which is provided with a catching/locking device (26) for the collimator. The device (26) is constructed so that the collimator can be exchanged only in the correct orientation of the cart relative to the active device or the storage device. An unlocking pin (34) of the cart enables the exchange with the exchanging system otherwise being blocked.

7 Claims, 2 Drawing Sheets

COLLIMATOR EXCHANGING SYSTEM

The invention relates to a collimator exchanging system for moving a collimator between a measuring position and a storage position.

A collimator exchanging system of this kind is described in Journal of Nuclear Medicine, Vol. 16, December 1975, pp. 1195–1196. As is mentioned therein, the system disclosed is not suitable for comparatively heavy collimators. Moreover, there is no facility for storing the collimator in a storage position. Such a facility is extremely desirable notably for heavy collimators. Using known exchanging systems, the mounting of the collimator in an active positon, for example, as a collimator for a radiation detection apparatus, such as a gamma camera, is a rather cumbersome operation and unambiguous positioning is not fully ensured. On the other hand, the storage of a collimator in a storage position is not ideal because an additional operation is required for securing the collimator. When the latter operation is omitted, which is not uncommon, the collimator could, for example, drop out of the storage position.

It is an object of the invention to mitigate these drawbacks. To achieve this, a collimator exchanging system of the kind set forth in accordance with the invention is characterized in that from a position of adjustable height in a cart the collimator can be coupled only in a given orientation with respect to the measuring position, or the storage position, from a fixed position in the cart to either an active position or a fixed storage position by means of a simple operation.

The exchanging system in accordance with the invention is constructed so that the collimator can be coupled only from a fixed orientation, so that the occurrence of accidents or errors during the exchange is precluded. Because uncoupling as well as coupling is realized by a simple operation and by means of a single cooperating system of means, a less stable intermediate position is avoided and the collimator cannot be coupled in an incorrect orientation.

In a preferred embodiment the active device, the cart, and the storage device include a catching device which cooperates with a locking mechanism of the collimator. The active device notably includes at least two and preferably three locking pins, for example, mushroom-shaped pins, which cooperate with locking sockets in the collimator. The locking sockets may be constructed, for example, to be rotatable and be provided at the top as well as the bottom with locking holes which cooperate by a catching mechanism of the cart with locking pins of an active device or a storage device.

A coupling mechanism of a further embodiment includes a ring which is secured to the collimator, and which couples and uncouples the collimator to and from the active device or the storage device by rotation, and hence to and from the cart. Notably two locking holes which are situated one over the other now cooperate so that in a fixed position of the collimator they couple the collimator to the cart in a first rotary position and couple the collimator to one of the devices in a second rotary position.

For the fixed mounting of the collimator in an active position, a preferred embodiment includes a resilient clamping device which is activatable by a clamping effect between the collimator on the cart and a relevant part of the active device, and which enables coupling only in the activated condition.

Figure 1B:
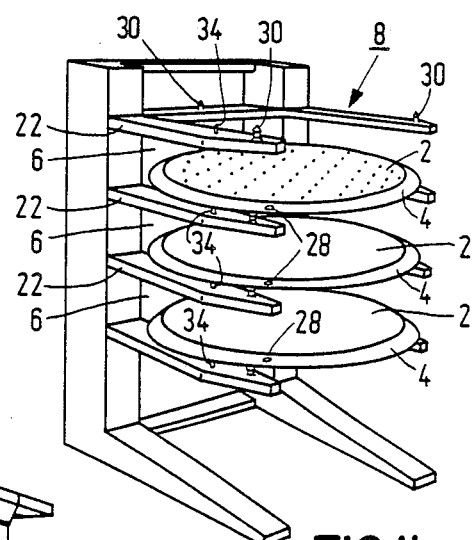
Figure 1C:
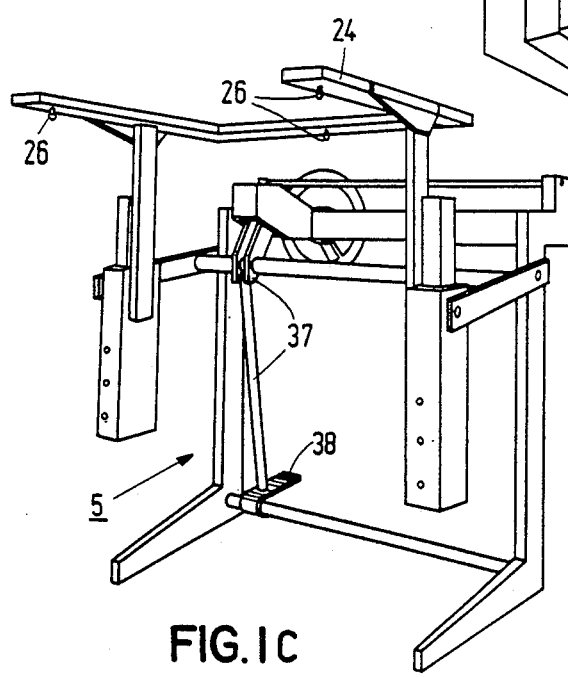

Some preferred embodiments in accordance with the invention will be described in detail hereinafter with reference to the accompanying drawing. Therein:

FIGS. 1a, 1b, and 1c diagrammatically show an exchanging system in accordance with the invention, and FIGS. 2a, 2b, 2c and 2d show a collimator including means to enable exchanging by means of such a system.

A collimator exchanging system as shown in FIGS. 1a, 1b, and 1c enable a collimator 2, mounted in a collimator ring 4, to be simply moved by means of a cart 5, from a storage position 6 in a storage device 8 to an active position 10 on, for example, a gamma camera 12 of a gamma tomography apparatus 14 as described in U.S. Pat. No. 4,459,485.

In the gamma tomography apparatus the gamma camera can be moved to various measurement positions by means of a carrier arm 16 and a counterweight which is accommodated in a housing 18; and any desired orientation can thus be imparted to an entrance face 20 of the camera. In view of possible camera unbalance it is advantageous to move the camera to a lower position during the exchange of a collimator, so that the entrance face extends horizontally at the top of the camera. The storage device 8 includes several storage yokes 22, each of which forms a storage position 6 for a collimator. For different types of examination, use is made of different collimators, so that the exchange and fetching of these collimators should preferably be simple. To this end, the collimator with a collimator ring can be non-detachably accommodated in a given orientation in the cart 5 for displacement between the storage rack and the gamma camera. To this end, the cart is provided with a carrier yoke 24 with catching means for accommodating the collimator. The catching means of the embodiment shown are formed by mushroom-shaped pins 26 which cooperate with recesses 28 formed in the collimator ring 4. In the described embodiment three mushroom-shaped pins 26 thus cooperate with three recesses 28. Corresponding catching pins 30 are provided on the carrier yokes 22 of the storage device 8. When the cart 5, the storage device 8, and the collimator 2 are correctly positioned relative to one another, the catching pins 30 of the storage device and those pins 26 of the cart are situated in a mutually rotated position so that, viewed across the collimator ring, they can be adjacently introduced into the cooperating openings thereof. When the catching pins 30 of the storage device 8 as well as those pins 26 of the cart 5 are positioned in the openings in the collimator ring 4, the collimator can be uncoupled from the cart under the influence of an unlocking pin 34 on the carrier yoke of the storage device, after which the cart can be removed. When the collimator is fetched from the storage device, the procedure is the same but takes place in the opposite direction. Similarly, the collimator can be transferred from the cart to an active position on the gamma camera. To this end, the gamma camera includes not only the three catching pins, but also an unlocking pin 36. In order to obtained secured coupling of the collimator to the gamma camera, the collimator ring in this case also includes three resilient clamping devices as shown in FIG. 2d which, when the collimator is mounted in the active position, enable the carting mechanism to be unlocked by the unlocking pin 36 only when a spring force is activated. Coupling can thus be realized only by means of the clamping spring device. In order to enable an adequate spring force to be exerted on the collimator, the cart is constructed to include a handle/lever system 37 which includes, for example a pedal 38 for (in this case) clamping the collimator accommodated on the cart and a ring or shield 39 of the gamma camera which is suitable for coupling.

Figure 2A:
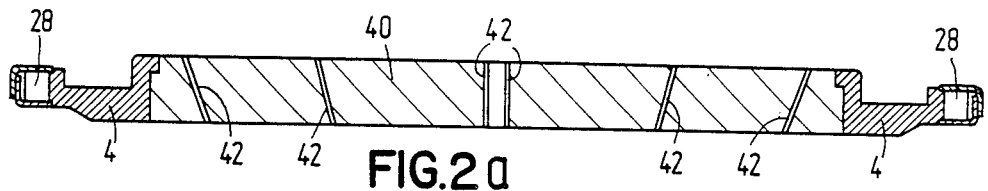
Figure 2B:
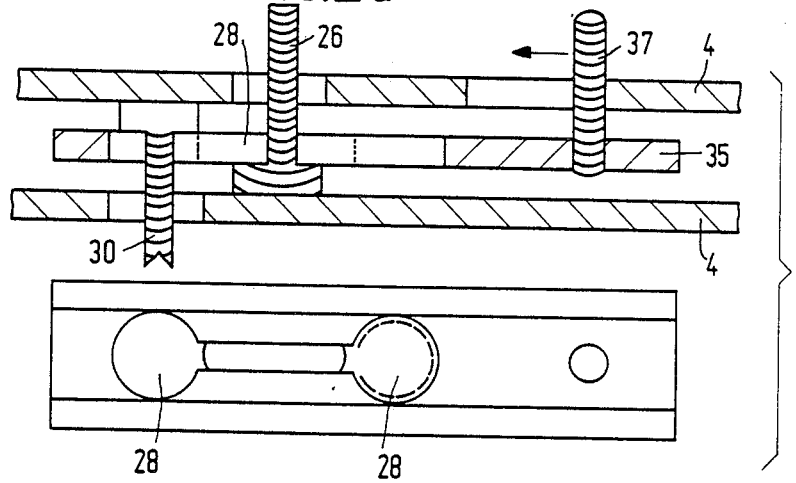

FIG. 2a is a sectional view of the collimator 2 with the collimator ring 4. The collimator includes a lead block (40) which constitutes the actual collimator and which is provided with a comparatively large number of bores (42) which are all directed towards the same point in the embodiment shown, thus forming a focussing collimator; however, they may alternatively extend in parallel and perpendicularly through the block in the usual manner. Other than a collimator as described herein for use in conjunction with a gamma camera, the collimator may also be a beam-limiting collimator, for example, for a linear accelerator or a cobalt irradiation apparatus. Such collimators define a field to be irradiated for which it is desirable to have a number of types of collimator available which can be easily exchanged. The carrier ring 4 is provided with the locking sockets 28 for the catching pins 26 of the storage device, the active device, and the cart, respectively. As is shown in FIG. 2b, each of these locking sockets may also be constructed by means of two bayonet-shaped diaphragms 28, one of which is connected to a slide 35 which is displaceable in the collimator, while the other diaphragm which extends in the opposite direction is rigidly connected to the collimator. When the collimator is coupled, the mushroom-shaped pins of the active device, the storage device, or the cart are secured by a slight, preferably manual rotation of the ring 4, or in this case the slide 35 by means of a pin 37, with respect to the collimator. As has already been stated, this displacement or rotation is inhibited for as long as it is not enabled by the unlocking pin of the cart which fits in an opening in the collimator ring. Thus, uncoupling in the absence of the cart is impossible unless special tools are used.

Figure 2C:
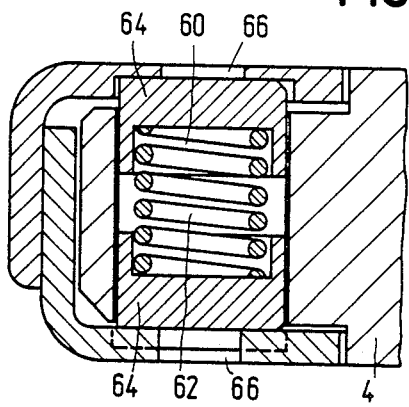
Figure 2D:
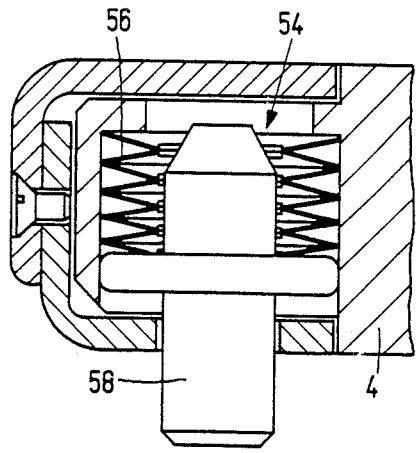

FIG. 2c shows an embodiment of a locking/unlocking mechanism. The collimator ring 4 is provided with a bush 60 with two depressable cams 64 which are supported by a spring 62. By openings 66 and 68, the cams can be depressed by the unlocking pin 24 of the cart on one side and of the storage device or active device on the other side.

FIG. 2d is a sectional view of a preferred embodiment for clamping the collimator to the measuring device under spring force. A spring 56 which is accommodated in a bush 54 in the collimator ring 4 is biased by means of a pin 58. The force required for this purpose can be provided by a clamping device provided on the cart as has already been described. Unlocking becomes possible only when the required force is exerted, i.e. upon displacement of the collimator relative to a holder of the active device and the associated depression of the pins 58, after which the collimator can be coupled to the active device.

What is claimed is:

1. In a system for exchanging a plurality of collimators between a measuring position and a storage position, a measuring means being at said measuring position for measuring radiation, a structure comprising
storage means for individually storing a plurality of separated collimators,
cart means for selecting one collimator from said storage means and for placing said one collimator relative to said measuring means, said cart means returning said one collimator from said measuring means to said storage means, wherein said one collimator is transferred by said cart means between said storage means and said measuring means only in a given orientation relative to said storage means and said measuring means.

2. A structure according to claim 1, wherein each of said storage means, said measuring means, and said cart means has locking pins, and wherein said collimators have catching sockets for cooperating with said locking pins.

3. A structure according to claim 2, wherein said locking pins are mushroom-shaped pins, and each of said storage means, said measuring means, and said cart means has at least three pins.

4. A structure according to claim 2 or claim 3, wherein each of said collimators includes a rotatable catching socket for each of said pins, said socket having an opening cooperating with each of said pins at both a top and a bottom portion of said socket.

5. A structure according to claim 1, claim 2, or claim 3, wherein said cart means includes means for protected height adjustment to provide collision free access to said storage means and said measuring means.

6. A structure according to claim 1, claim 2, or claim 3, wherein each of said plurality of collimators includes resilient clamping means for cooperating with said measuring means, said resilient clamping means being activated upon coupling.

7. A structure according to claim 1, claim 2, or claim 3, wherein each of said collimators includes a collimator ring surrounding a collimator periphery, said collimator ring having a plurality of openings at both sides of said ring, said plurality of openings at one side of said ring being shifted along an arc of a circle of said ring relative to said plurality of openings at an opposite side of said ring, and wherein said openings cooperate with pins on each of said storage means, said measuring means, and said cart means.

* * * * *